United States Patent Office 2,982,503
Patented May 2, 1961

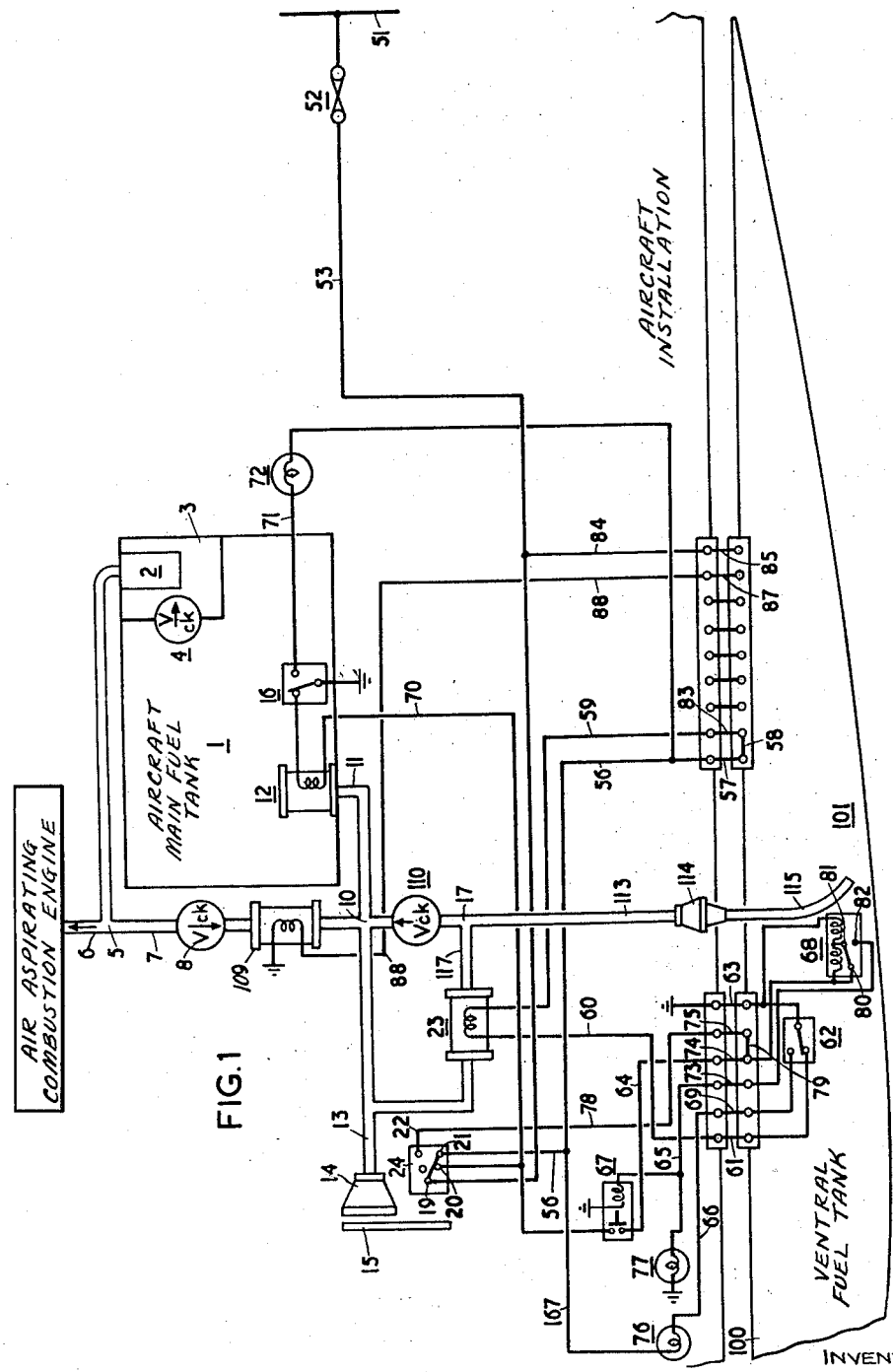

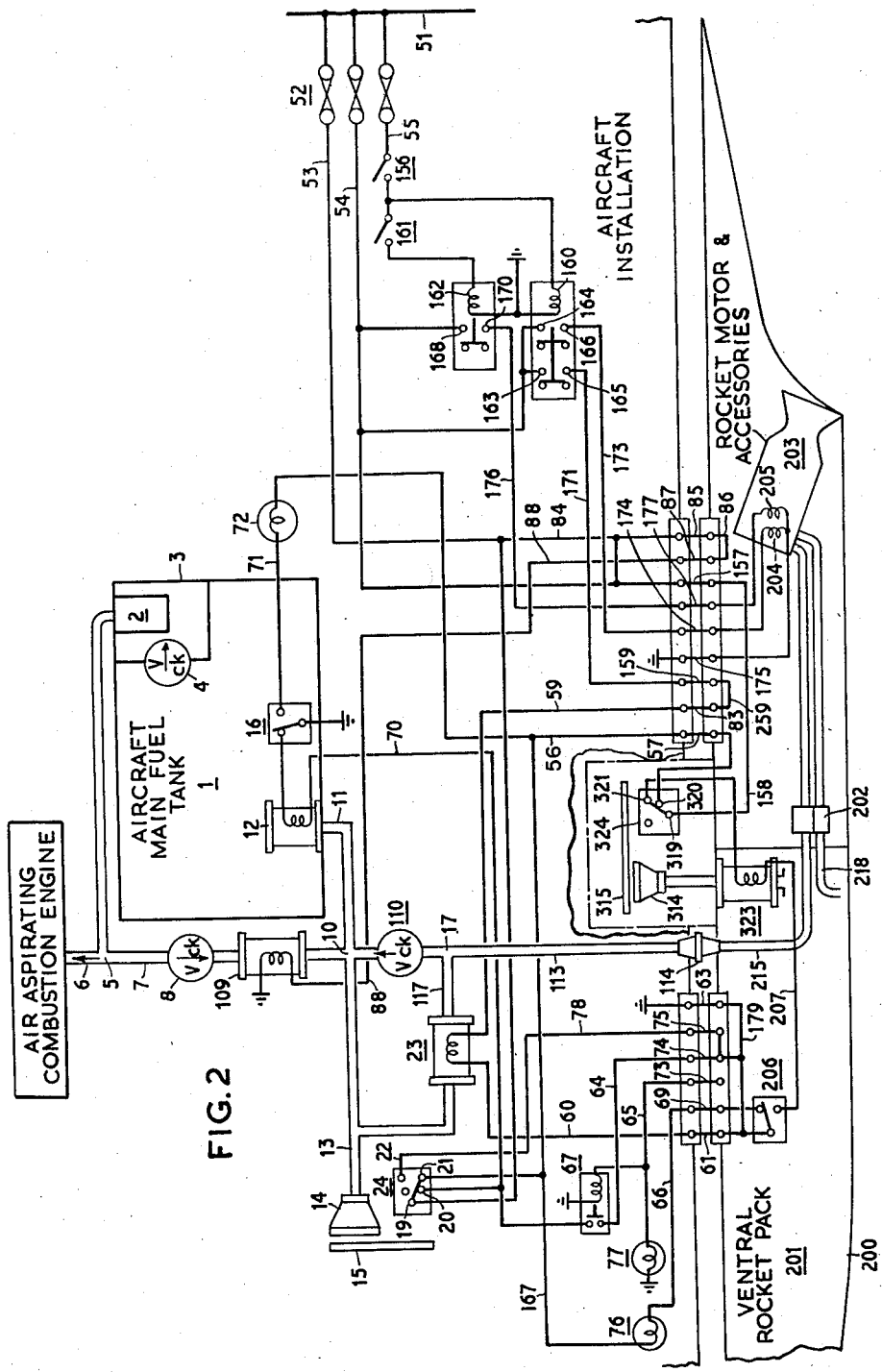

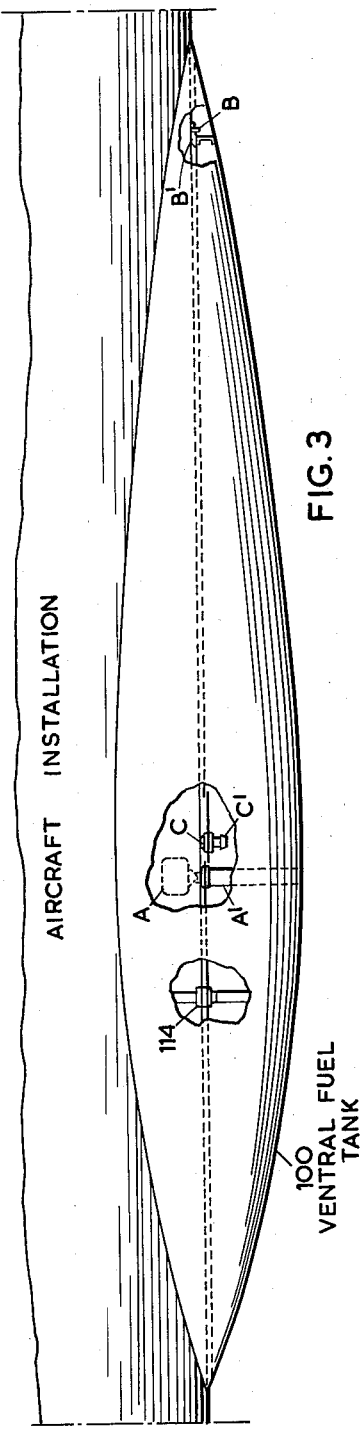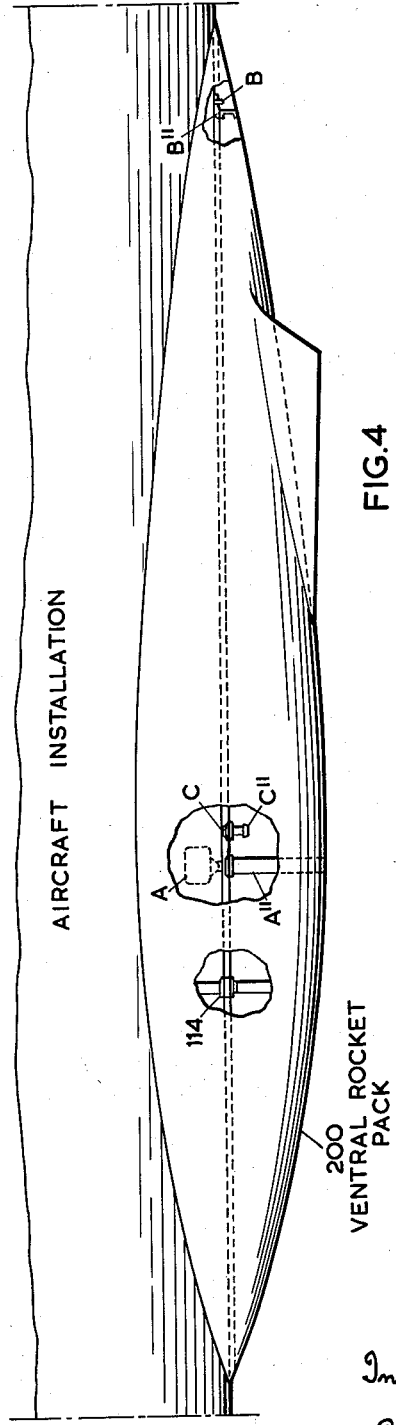

2,982,503

ROCKET MOTOR ATTACHMENTS

Thomas Cochrane Campbell, St. Annes-on-Sea, England, assignor to The English Electric Company Limited, London, England, a British company Filed Dec. 5, 1955, Ser. No. 550,893

Claims priority, application Germany Dec. 14, 1954

1 Claim. (Cl. 244—135)

The invention relates to a rocket motor attachment to an aircraft propelled normally by air aspirating combustion engines, for example by turbo-jet or turbo-prop gas turbines, ram and pulse jets and piston internal combustion engines. At very high altitudes such rocket motors, which are independent of the atmospheric oxygen, have been used for supplying additional propulsion power to the aircraft.

Conversely, for increased endurance of flight with the normal power plant an additional fuel tank, e.g. a ventral tank, is usually carried by the aircraft, which is preferably adapted to be jettisoned in flight when empty.

According to the invention, a unit containing a rocket motor or motors and the liquid oxidant therefor, is attached detachably to a mechanical automatic disconnect joint and an automatic fuel disconnect joint on the belly of an aircraft fuselage for a ventral tank, an auxiliary fuel cock being provided between the said fuel disconnect joint and the air aspirating combustion engine which is automatically adjusted so that liquid fuel from the ordinary fuel tanks for the air aspirating combustion engine may be fed to the rocket motor unit, or liquid fuel from the said ventral tank may be drawn to the said ordinary fuel tanks according to whether the rocket motor unit or the ventral tank is fitted to the aircraft. The arrangements of the ordinary fuel system and its associated electric wiring is such that all necessary changes in the ordinary fuel system and wiring are made automatically when either the rocket motor unit or the ventral tank is fitted.

While in an emergency the rocket motor unit can be jettisoned in flight by the same well known means as the ventral tank, it will not usually be jettisoned because of its much higher cost.

In order that the invention may be clearly understood an embodiment thereof will now be described by way of example with reference to the accompanying drawings in which:

Fig. 1 is a diagrammatic view of the relevant part of the usual system and associated wiring for a ventral tank, modified according to the present invention, with the said ventral tank attached.

Fig. 2 corresponds to Fig. 1 but shows the rocket motor unit attached, the components inside the chain-dotted square belonging to the said rocket motor unit. Fig. 3 is a lateral part elevation more graphically showing an aircraft installation having the combination of a detachable ventral fuel tank. Fig. 4 is a corresponding view having a detachable ventral rocket pack attached.

Referring to Fig 1:

On the main fuel tank 1 a fuel pump 2 is arranged in a separate compartment 3 communicating with tank 1 through a non-return valve 4. The pump 2 is connected to a branching point 5 from where a pipe 6 leads to the air aspirating combustion engine, and from there another pipe 7 leads through a non-return valve 8 and a solenoid controlled auxiliary fuel cock 109 to another branching point 10 from where one pipe 11 leads through a pressure refuelling valve 12 to the main fuel tank 1 while another pipe 13 leads to a pressure refuelling connection 14 on the side of the aircraft fuselage. The solenoid controlled auxiliary fuel cock 109 is kept closed during refuelling and in flight when the ventral tank is fitted, and is kept open when the rocket motor unit is fitted.

The pressure refuelling valve 12 is solenoid operated and controlled through an electrical system to be described later.

The pressure refuelling connection 14 is arranged behind an access door 15 which controls a throwover micro-switch denoted by 24 as a whole, to be described in detail in connection with the electrical system. This pressure refuelling connection 14, which as stated is connected by the said pipe 13 to the branching point 10, is also connected by a pipe 117, controlled by a solenoid operated pressure refuelling valve 23, to another branching point 17.

A non-return valve 110 arranged in the connection between the two branching points 10 and 17 allows flow from the point 17 to the point 10 only. A fuel pipe 113 leads from the branching point 17 to an automatic fuel disconnect joint 114 on the belly of the aircraft to which alternatively the auxiliary fuel tank 101 of the ventral tank unit 100 can be connected by a pipe 115 or the pump 202 of the rocket motor unit 200 (Fig. 2) can be connected by a pipe 215.

When the aircraft is on the ground with the ventral tank unit 100 fitted and the access door 15 is open, the pressure refuelling valves 12 and 23 are kept open by their solenoids being energized by circuits controlled by the said micro-switch 24. Fuel can then be supplied from an outside source (not shown) through the pressure refuelling connection 14 to the main fuel tank 1 through pipe 13, branching point 10, pipe 11 and pressure refuelling valve 12.

At the same time fuel can be supplied through the pressure refuelling connection 13, pressure refuelling valve 23, pipe 117, branching point 17, pipe 113, fuel disconnect joint 114, pipe 115 to the auxiliary fuel tank 101 in the ventral tank unit 100. When tanks 1 and 101 are filled to capacity, the pressure refuelling valves 12 and 23 are closed, the circuits of their respective solenoids being then interrupted by float switches 16 and 62 respectively.

When the access door 15 is closed, the circuit of the solenoid valve 23 is broken by the said micro-switch 24 which is controlled by the said access door 15 as will be described later. In this condition the solenoid circuit of valve 12 is controlled by the float switch 16, a fluid level switch 68, and a relay switch 67. The operation of this circuit, which is described later in more detail, is such that when fuel is drawn from the main tank 1, the solenoid of valve 12 is energised and valve 12 opens. Fuel may then flow, under pressure, from the auxiliary tank 101 through the non-return valve 110 into the main fuel tank 1, but not from the main fuel tank 1 into the auxiliary tank 101. When the auxiliary tank 101 is empty, the fluid level switch 68 operates to energise the solenoid of relay switch 67 thus opening switch 67 and interrupting the solenoid circuit of valve 12. Valve 12 then closes and remains closed for the remainder of the flight so preventing pressure from the usual pressurising system (not shown) of the auxiliary tank 101 building up in the main tank 1.

The ventral tank unit 100 is attached by the usual remote controlled mechanical automatic disconnect joints (Fig. 3) to the belly of the aircraft fuselage, and its pipe 115 which is connected to the said fuel disconnect joint 114 ends near the bottom of the fuel tank 101 of the said ventral tank unit 100. The usual connection of the tank 101 to a source of tank pressurising air (not shown) in the aircraft fuselage is also provided.

The electrical system comprises a source of electrical current (not shown) one pole of which is earthed and the other one, 51, is connected through fuses, or circuit breakers, collectively denoted 52 to the conductors 53 (Fig. 1), 54 and 55 (Fig. 2), of which conductor 53 serves for the additional fuel tank, and conductors 54 and 55 serve for the rocket motor unit and will be described later with reference to Fig. 2.

The conductor 53 leads to the pivot point 19 of the said micro-switch 24, controlled by the access door 15 of the pressure refuelling connection 14, and is continued from the contact piece 21 of the said micro-switch 24 by a conductor 56 to an electrical automatic disconnect joint 57 between the ventral tank unit 100 and the aircraft fuselage, containing a bridge piece 58 and from there by an electrical automatic disconnect joint 83 and conductor 59 to the solenoid of pressure refuelling valve 23. From there a conductor 60 leads to another electrical automatic disconnect joint 61, a float switch 62 in the fuel tank 101 of the ventral tank unit 100, and a further automatic electrical disconnect joint 63 to "ground" i.e. the fuselage. The float switch 62 is normally closed when the tank 101 is not full.

In the condition described the circuit I: 51—52—53—19—21—56—57—58—83—59—23—60—61—62—63—ground is closed, and the solenoid of valve 23 is energised.

From the contact piece 20 of the micro-switch 24 a conductor 70 is branched-off to the solenoid of the pressure refuelling valve 12 on the main fuel tank 1 and from there to the float switch 16 the pivot point of which is earthed. Switch 16 is normally closed as long as the main fuel tank 1 is not full.

In the condition described the circuit II: 51—52—53—19—20—70—12—16—ground is closed and the solenoid of valve 12 is energised.

With the circuits I and II closed as described above, the refuelling operation can be carried out.

From contact point 21 of switch 24 a branch 167 of conductor 56 leads to an indicator lamp 76, thence by conductor 66 and electrical automatic disconnect joint 69 to the open contact of switch 62. The pivot point of switch 62 is connected to electrical automatic disconnect joint 63 and hence to "ground" i.e. the fuselage. When tank 101 is full, switch 62 opens, circuit I is interrupted and valve 23 closes.

Accordingly in the above conditions the circuit III: 51—52—53—19—21—56—167—76—66—69—62—63—ground is closed, and the indicator lamp 76 is lit.

From the open contact of float switch 16 in tank 1 a conductor 71 leads to an indicator lamp 72 and thence to lead 56; when tank 1 is full, switch 16 opens, circuit II is interrupted and valve 12 closes.

Accordingly in the above conditions circuit IV: 51—52—53—19—21—56—72—71—16—ground is closed and the indicator lamp 72 is lit.

When the refuelling operation is completed, door 15 is closed, thereby operating switch 24 to open contacts 19—20—21 and to close contacts 19—22. From contact 22 a conductor 78 leads to electrical automatic disconnect joint 75, bridge piece 79, electrical automatic disconnect joint 74 and line 64 to relay switch 67 and thence to conductor 70. From the bridge piece 79 a further conductor is led to one end of the bi-metallic element and pivot 80 of fluid level switch 68. Contact 81 of switch 68, is connected to the centre of the bi-metallic element, the remaining end of which is connected via the said electric automatic disconnect joint 63 to ground, i.e. the fuselage. Contact 82 of switch 68 is connected via electrical automatic disconnect joint 73 to conductor 65 and thence through the warning light 77 to "ground" i.e. the fuselage, and also to the solenoid or relay switch 67 and again to "ground".

When fuel is drawn from main fuel tank 1, switch 16 closes, and while fuel remains in the auxiliary tank 101, contacts 80 and 82 of fluid level switch 68 remain disconnected.

Accordingly in the above conditions circuit V: 51—52—53—19—22—78—75—79—74—64—67—70—12—16—ground is closed, and the solenoid of valve 12 is energized. Valve 12 is therefore open, and fuel is forced by the tank pressurising air out of the auxiliary tank 101 through pipe 115, fuel disconnect joint 114, pipe 113, non-return valve 110, branching point 10, pipe 11 and pressure refuelling valve 12 into main fuel tank 1. When tank 1 is full, switch 16 opens and circuit V is interrupted, so as to close valve 12. This process is repeated until the auxiliary tank 101 is empty.

When the auxiliary tank 101 is empty a temperature rise occurs in the bi-metallic element of the fluid level-switch 68, causing the switch arm to throw-over and to connect the pivot 80 to contact 82.

Accordingly in this condition circuits VI:

51—52—53—19—22—78— ⎤—77—ground
75—79—80—82—73—65 ⎦—67—ground are closed, energising the solenoid of switch 67, so breaking circuit V and thus closing valve 12, while the warning light 77 is lit indicating "auxiliary tank empty."

When no ventral tank unit is fitted or the same has been jettisoned, the circuits I, III, V, and VI are interrupted by the electrical automatic disconnect joints 61, 69, 73, 74, 75, 63, 57, 83. When the access door 15 is closed, circuit IV is also interrupted, and under both these conditions valve 12 remains closed.

Referring now to Fig. 2, the chain-dotted square of which encloses components arranged in the ventral rocket pack, the rocket motor unit is attached to the same mechanical automatic disconnect joints as the ventral tank unit 100 in Fig. 1. The fuel pipe 113 in the aircraft fuselage then links up, as stated, through the fuel disconnect joint 114 with a fuel pipe 215 in the rocket motor unit 200 which pipe leads to the pump 202 supplying the fuel system of the rocket motors 203.

Another unit of the said pump unit 202 draws liquid oxidant from the tank 201 of the rocket motor unit 200 through a pipe 218 and delivers this liquid oxidant likewise to the system of the rocket motors 203, of which one only is shown. The liquid oxidant tank 201 of the rocket motor unit 200 is filled through a pressure refuelling connection 314 arranged behind an access door 315 in the rocket motor unit 200 which controls a microswitch denoted by 324 as a whole. The pressure refuelling connection 314 is connected through a solenoid operated pressure refuelling valve 323 to the liquid oxidant tank 201.

The solenoid of the solenoid controlled fuel cock 109 is connected at one terminal to ground and at the other terminal through a conductor 88 to a bridge piece 87, and only when the rocket motor unit 200 is fitted over a conductor 86 to a bridge piece 85, which is connected through a conductor 84 to the conductor 53 and hence to the pole 51.

Accordingly when the ventral tank unit 100 is fitted (Fig. 1) the circuit of the auxiliary solenoid operated cock 109 is broken, and this cock is then kept closed. Conversely, with the rocket motor unit 200 fitted (Fig. 2) this circuit VIa: 51—52—53—84—85—86—87—88—109—ground is closed, the solenoid is energised, and the cock 109 is kept open.

Thus the auxiliary fuel cock 109 is automatically adjusted to the correct position corresponding either to the ventral fuel tank or the rocket motor unit being fitted.

The electrical system for the rocket motor unit is as follows:

From the pole 51 of the electric current source the conductor 54 leads through an electrical automatic disconnect joint 157 and a conductor 158 inside the rocket motor unit to the pivot point 319 of the said micro-switch 324.

Another conductor 55 leads from the pole 51 to the main cockpit switch 156 and from there, in parallel, through a relay coil 160 directly to ground, and through another auxiliary switch 161 and another relay coil 162 likewise to ground.

The relay controlled by the coil 160 has four contacts 163, 164, 165, 166, of which two, 163 and 164 are connected to the aforesaid conductor 54, and the relay controlled by the coil 162 has two contacts 168 and 170 of which 168 is connected to the said conductor 54.

The contact 165 is connected to a conductor 171, and by an electrical automatic disconnect joint 159, bridge piece 259, electrical automatic disconnect joint 83 to the conductor 59 leading to the solenoid operated valve 23 as described hereinabove with reference to Fig. 1.

The contact 166 is connected by a conductor 173 to another electrical automatic disconnect joint 174 and from there inside the rocket motor unit 200 to a circuit containing the solenoid 204 of the main on/off valve (not shown) of one of the rocket motors 203, and over another electrical automatic disconnect joint 175 to ground.

The contact 170 is connected by a conductor 176 to yet another electrical automatic disconnect joint 177 and, inside the rocket motor unit 200, to a circuit containing the solenoid 205 of the auxiliary on/off valve (not shown) of the second one of the rocket motors 203, and from said solenoid 205 through the said electrical automatic disconnect joint 175 to ground.

A float operated switch 206 of the liquid oxidant tank 201, the pivot point of which is connected to the electrical automatic disconnect joint 61 and through a bridge piece 179 to electrical automatic disconnect joint 63 and so to ground, has two positions, in one, when the tank joint 201 is full, it establishes connection over the electrical automatic disconnect joint 69 and the conductor 66 inside the aircraft fuselage to the cockpit indicator lamp 76, and from there over conductor 167 to conductor 56 as described with reference to Fig. 1. In the other position, when the tank 201 is not full, it establishes connection through a conductor 207 to the solenoid of the liquid oxidant pressure refuelling valve 323 and thence to the contact 321 of the micro-switch 324 controlled by the access door 315 of the pressure refuelling connection 314. A contact 320 of the said micro-switch is connected to the electrical automatic disconnect joint 57 described hereinabove with reference to Fig. 1.

When the rocket motor unit 200 is fitted and the main cockpit switch 156 is closed, the relay coil 160 is energised and closes the following circuits: VII, 51—52—54—163—165—171—159—259—83—59—23 — 60 — 61 — 179—63—ground; VIII, 51—52—54—164—166—173—174—204—175—ground.

With circuit VII closed, the solenoid of valve 23 is energised and valve 23 opens, whereby fuel can flow from the main tank 1 through pump 2, non-return valve 8, cock 109, branching point 10, pipe 13, valve 23, pipe 117, branching point 17, pipe 113, fuel disconnect joint 114, pipe 215 to the pump unit 202.

With circuit VIII closed, the main on/off valve (not shown) opens, starting the pump 202, and permitting fuel and oxidant to be supplied to the system of one of the rocket motors 203, so starting the said rocket motor. The other rocket motor remains inactive, until the auxiliary cockpit switch 161 is closed.

When the aforesaid switch 161 is closed, the relay is energised and the following circuit is established—IX: 51—52—54—168—170—176—177—205—175—ground, whereby the auxiliary on/off valve (not shown) is opened, supplying increased power to the pump 202, and permitting fuel and oxidant to be supplied to the system of the second one of rocket motors 203, so starting this rocket motor.

It will be clear from the foregoing, that one or both rocket motors can be selected as desired, so enabling full or half rocket motor power to be used.

With the rocket motor unit fitted, the circuits I, III, V, VI of Fig. 1 no longer exist, and when circuits II and VI are established as described with reference to Fig. 1, refuelling through connection 14 (Fig. 1) only fills the main fuel tank 1 (Fig. 1) and no flow is possible to the fuel pump 202 (Fig. 2) of the rocket motor unit 200.

Referring again to Fig. 2, when the access door 315 in the rocket motor unit 200 is opened, this actuates the micro-switch 324 making the contacts 319—320—321. If the oxidant tank 201 is full, then float switch 206 will be as shown and the following circuit established—X: 51—52—54—157—158—319—320—57—56—167—76— 66 — 69—206—63—ground. The indicator lamp 76 is lit indicating "tank full." If the oxidant tank 201 is not full, then float switch 206 will be opened and the following circuit is established—XI: 51—52—54—157—158—319—321—323—207—206—63—ground. The solenoid of valve 323 is energised, opening the said valve and permitting liquid oxidant to be supplied to tank 201 through the refuelling connection 314. When the tank 201 is full, switch 206 closes, thereby interrupting circuit XI and closing solenoid operated valve 323 while establishing circuit X and thereby lighting the indicator lamp 76.

It will be noted in Fig. 2, that the thrust lines of the rocket motor 203 are not horizontal. The thrust lines of rocket motors 203 are inclined in elevation (as shown) and in plan (not shown) so that they pass through the centre of gravity of the aircraft thus avoiding changes of trim of the aircraft when the rocket motors are switched on or off.

Referring now to Figs. 3 and 4, the ventral fuel tank 100 or ventral rocket pack 200 are attached to the aircraft installation by means of an automatic mechanical disconnect joint, the parts of which are denoted A, B on the aircraft, A', B' on the ventral fuel tank 100 and A", B" on the ventral rocket pack 200. When the disconnect joint parts A, A' or A, A" are released from one another the ventral fuel tank 100 or ventral rocket pack 200 swings with its hooks B', B" respectively about the corresponding pins B of the aircraft installation (in the counter-clockwise sense of Figs. 3 and 4) and disengages itself. The automatic fuel disconnect joint 114 is diagrammatically shown in both Figs. 3 and 4, and likewise the electrical disconnect joints, denoted as a whole C for the part thereof in the aircraft installation, and C', C" in the ventral fuel tank 100 and in the ventral rocket pack 200, respectively.

While I have herein described and illustrated in the accompanying drawings what may be considered a typical and particularly advantageous embodiment of my said invention I wish it to be understood that I do not limit myself to the particular details and dimensions described and illustrated for obvious modifications will occur to a person skilled in the art.

What I claim as my invention and desire to secure by Letters Patent, is:

A dual-purpose aircraft capable of being adapted without structural changes for use as a high-thrust short range aircraft and as a high-endurance long range aircraft, comprising in combination an aircraft structure, an air aspirating combustion engine and a main fuel tank mounted in the said aircraft structure, a fuel pump arranged on said main fuel tank, a mechanical automatic disconnect joint and an automatic fuel disconnect joint arranged on the underside of the said aircraft structure, a first fuel pipe connecting the said automatic fuel disconnect joint to the said air aspirating combustion engine, a second fuel pipe branching off the said first fuel pipe and connecting the same to the said fuel pump, a third fuel pipe branching off from said first fuel pipe at a point more remote from the said air aspirating combustion engine than the branching off point of the said second fuel pipe and connecting the said first fuel pipe to the said fuel tank, a first fuel cock arranged in the said first fuel pipe between the branching off points of the said second and third fuel pipes, a check valve opening towards said first fuel cock arranged in said first fuel pipe between said first fuel cock and said fuel disconnect joint, a by-pass pipe bridging over the said check valve, a second fuel cock arranged in the said by-pass pipe, a pressurised ventral auxiliary fuel tank unit and a ventral rocket motor unit alternatively attachable to the said automatic mechanical and fuel disconnect joints, said first fuel cock having a closed position establishing fuel flow from the said pressurized auxiliary fuel tank when fitted to the said aircraft structure, through said fuel disconnect joint, first and third fuel pipes to the said main fuel tank, and an open position establishing fuel flow from the said main fuel tank through the said second fuel pipe, first and second fuel cocks, by-pass pipe, first fuel pipe and fuel disconnect joint to said ventral rocket motor unit, when fitted to said aircraft structure.

References Cited in the file of this patent

UNITED STATES PATENTS

| | | |
|---|---|---|
| 2,372,448 | Porteous | Mar. 27, 1945 |
| 2,440,262 | Grey et al. | Apr. 27, 1948 |
| 2,470,564 | Lawrence et al. | May 17, 1949 |
| 2,502,416 | Brown | Apr. 4, 1950 |
| 2,708,342 | Allen et al. | May 17, 1955 |
| 2,777,655 | Graham | Jan. 15, 1957 |
| 2,810,534 | Fandeux | Oct. 22, 1957 |
| 2,833,494 | Parker et al. | May 6, 1958 |
| 2,848,181 | Landers | Aug. 19, 1958 |